H. W. HODGDON AND P. F. GREEN.
POTATO PEELING MACHINE.
APPLICATION FILED DEC. 5, 1921.
1,422,708.
Patented July 11, 1922.
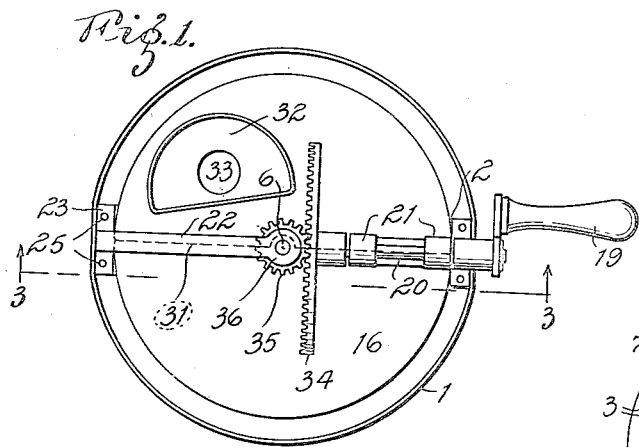
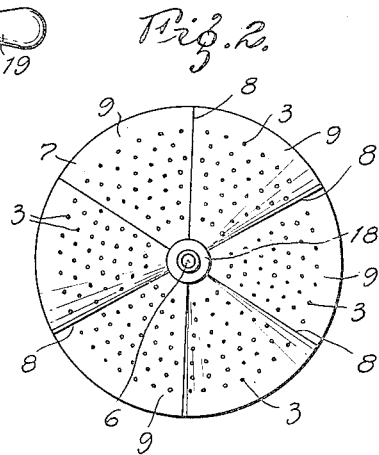
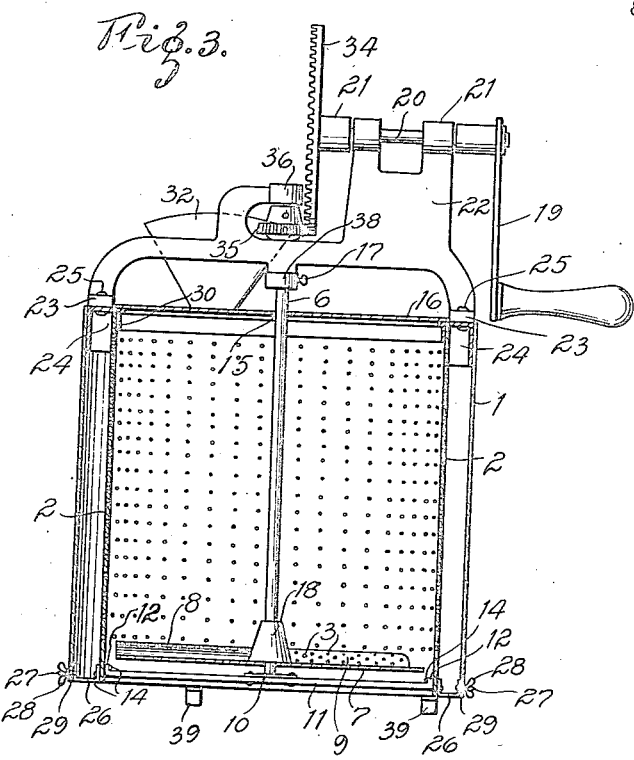
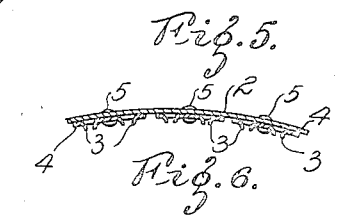
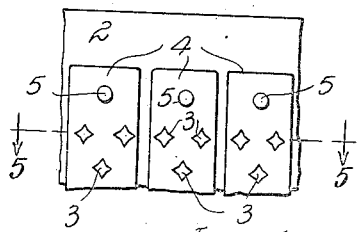
Inventors:
Herbert W. Hodgdon
Pansy F. Green.
By John C. Houston
Attorney.

UNITED STATES PATENT OFFICE.

HERBERT W. HODGDON AND PANSY F. GREEN, OF ST. LOUIS, MISSOURI.

POTATO-PEELING MACHINE.

1,422,708. Specification of Letters Patent. Patented July 11, 1922.

Application filed December 5, 1921. Serial No. 519,860.

*To all whom it may concern:*

Be it known that we, HERBERT W. HODGDON and PANSY F. GREEN, citizens of the United States, and residents of St. Louis, Missouri, have invented certain new and useful Improvements in Potato-Peeling Machines, of which the following is a specification containing a full, clear, and exact description, reference being had to the accompanying drawings, forming a part hereof.

Our invention consists in the novel disclosure hereinafter particularly described, and distinctly claimed.

The object of our invention is to provide an improved portable machine, for peeling potatoes and other vegetables in the kitchens of ordinary households, as well as in restaurants, hotels, and other places; and which shall be of low cost and high efficiency, because of its simplicity and durability, and by reason of the fact that the machine is ordinarily so light and small that it can be operated by hand-power, without the expense and complication of an electric motor, or any other motor, for driving the machine.

In the drawings,

Fig. 1 is a top plan-view of a peeling-machine embodying our invention.

Fig. 2 is a detail top plan-view of the rotary peeling and supporting disk, detached from the machine.

Fig. 3 is a vertical section of the machine, taken on the line 3—3 of Fig. 1.

Fig. 4 is an enlarged detail fragmentary view, illustrating the preferred form of the vertical cutting-wall of the machine, the section being taken on the line 4—4 of Fig. 3.

Fig. 5 is a view similar to the last, but showing a modified form of the vertical cutting-wall, the section being taken on the line 5—5 of Fig. 6, and Fig. 6 is a fragmentary side-elevation of the modified form of the cutting-wall shown in Fig. 5.

The numeral 1 designates a cylindrical open-ended outer casing having imperforate walls, and preferably made of sheet-metal, and arranged to surround the vertical cutting-wall 2, only in cases where a perforated vertical cutting-wall is used to prevent the splashing of water outwardly through the perforations of said cutting-wall, and thereby avoid the mussing up of the kitchen sink or other utensil in which the machine is being used.

Of course the said outer casing 1 will also prevent the soiling of the operator's clothing by splashing water.

The said outer casing 1 need not be used at all in cases where the splashing of water through the perforated vertical cutting wall is not objectionable, or when the imperforate form of cutting wall shown in Figs. 5 and 6 is used; the machine being operatively independent of said outer casing, will do its work just as efficiently without the latter.

The numeral 2 designates the vertical cutting-wall, which is perferably made in the form of a cylinder having numerous perforations throughout its cutting surface, made by a sharp-ended punch driven through the material from its outer side, so as to produce upon the interior of said cylinder a corresponding series of projecting points or cutters 3, as shown more clearly in Fig. 4.

In the modified form of the vertical cutting-wall 2, (shown in Figs. 5 and 6) a series of vertical strips of slats 4 are provided upon their inner surfaces with numerous cutting or scraping points 3, in the manner just described; and said strips or slats are fixed vertically parallel to each other upon the inner surface of the cutting-wall cylinder 2, by means of nails or rivets 5, or other fastening devices.

Mounted within the cutting-wall cylinder 2, near the lower end of same, and fixed upon a vertical shaft or spindle 6, is a rotary peeling and supporting disk 7, which has its upper face provided with radial ridges or projections 8, between depressions 9; and the upper surfaces of both ridges and depressed portions are provided with perforations and teeth, in the manner just described concerning the said vertical cutting-wall of the said cutting-wall cylinder 2.

Said rotary peeling and supporting disk 7 acts as a rotary bottom for the said cutting or peeling cylinder 2, and supports the potatoes or other vegetables to be peeled, and simultaneously carries them around as said disk is rotated, and causes them to be thrown and held by centrifugal force into contact with the said cutters 3 carried by the inner face of the said cutting cylinder; and at the same time said vegetables are abraded and peeled by said cutters 3 which project upon the upper surface of the said radial ridges 8 and depressed portions 9 of the said rotary disk.

The said vertical shaft 6 has its lower end detachably mounted in a step bearing 10 at the center of the length of a cross-bar 11 which extends diametrically across the lower open end of the said cutting cylinder 2; the ends of said cross-bar being provided with attaching flanges 12 secured to said cylinder by rivets 14 or other fastening means.

The upper portion of the said vertical shaft 6 passes loosely through a central opening 15 formed in a detachable cover 16 of the said cutting-cylinder 2, and projects a distance above said cover, and is detachably connected to the driving-gear collar by means of a set-screw 17 or other suitable fastening-device.

An important feature of our invention is the top-drive arrangement, which will be presently described in detail, inasmuch as all of the driving-mechanism is thereby located above the cutting-cylinder, out of the way of the water used in operating the machine, so there is no damage to said mechanism by wetting same, and the bottom end of the machine may be set directly upon the bottom of a kitchen sink, or in a tub, or pail, as may be preferred.

A conical spreader 18, Fig. 3, is fixed by solder or other fastening-means upon the upper face of the said rotary disk 7, centrally of the latter, to spread the vegetables thereat, as well as to act as a brace for the disk and shaft.

Although we have herein illustrated a hand-power driving gear, it is evident that the same may be (in some cases) displaced by a motor-driven gear, in which latter case the hand-crank 19 would of course not be used.

In the present case, the said hand-crank is used to impart motion to a horizontal crank-shaft 20 that is mounted in bearings 21 of a gear-frame 22, secured to the upper end of said cutting-cylinder 2 in any desired manner.

In the present case, the said gear-frame 22 has its supporting-feet 23 secured to diametrically-opposite lugs 24 that are fixed to the upper portion of said cutting-cylinder 2. Bolts or rivets 25 are passed through registering holes in the said feet 23 of said gear-frame and said lugs 24 of said cutting-cylinder 2, to fasten said gear-frame in place upon the machine, so that the latter can be lifted bodily out of the top of the said casing 1, when it is desired to clean the said cylinder and the other parts, or to repair the same.

Said lugs 24 space apart the upper end of said casing 1 and cylinder 2, and brackets 26 space apart the lower ends of said casing and cylinder; said brackets being fixed to the said cylinder by means of rivets 14, previously mentioned.

A thumb-screw or similar fastening means 27 has its outer end fitted with a winged-nut 28, and its inner end is fixed to the lower portion of said cylinder 2, so that said screw will pass through a slot 29 in the lower edge of said casing; whereby said parts will be clamped together when said winged-nut is tightened up, and be released when said nut is loosened.

By loosening said winged-nuts 28 on diametrically-opposite sides of the machine, the operative parts of the machine can be readily lifted out of said casing 1, for cleaning or repairs, and replaced when desired to use the machine with a protective casing.

Said cover 16 has the usual depending marginal flange 30, which fits within the upper end of said cutting-cylinder 2, and for convenience in detaching, the said cover is made in semi-circular halves, as indicated by the dotted dividing-line 31, in Fig. 1, so that either half may be taken off separately, without disturbing the position of the said gear-frame.

A funnel 32 is fixed upon one of said semi-circular sections of said cover 2, so that a supply of water may be discharged into said funnel, and thence through an opening 33 in said cover, from a faucet while the machine rests upon the bottom of the kitchen sink, or stands in a tub or bucket.

Of course, the supply of water may be had from any other convenient source; and water may be poured into the funnel of the machine from a cup, pan, or pail, if no water faucet is at hand, in order to keep the particles of peelings washed away through the open bottom of the said cutting-cylinder 2.

Motion is communicated to the said vertical shaft 6, by a gear-wheel 34 fixed on the end of said crank-shaft 20, meshing with the teeth of a pinion 35 whose journals are mounted in vertically-aligned bearings 36 and 37 of said gear-frame 22, Fig. 3; the said previously-mentioned driving-gear collar 38 being fixed on the lower end of the lower journal of said pinion.

Said collar 38 has, of course, a bore or socket into which the upper end of the said vertical shaft 6 is loosely inserted, but clamped therein by the said set-screw 17.

*The operation.*

The operation of our machine will be readily apparent from the above description, but it may be here repeated in part, as follows:—

The potatoes, or other vegetables to be peeled, are placed in the said cutting-cylinder 2, by removing a section or all of said cover 16. The machine will operate satisfactorily with a few vegetables, or with a large number of vegetables, in said cylinder 2.

Then the said vertical shaft 6, carrying said rotary disk 7, and its load of vegetables, should be rapidly rotated, by turning the said hand-crank 19 in either direction, or steadily in one direction.

Centrifugal force will thereupon cause the vegetables to be urged and held in contact with the said cutters 3 upon the interior of said cylinder 2, and their contact with the latter will whirl or turn them in all directions, and they will roll upon each other, and quickly and successively present all of the unpeeled surfaces to the action of said cutters; and said vegetables will be efficiently peeled, without waste of the vegetable meat.

Simultaneously with the action of the said cutters 3 of the said cutting-cylinder 2, the vegetables resting upon the said rotary disk 7 will have portions of their peelings removed by the cutters 3, or grating-elements, of the said radial-ridges 8 and depressed portions 9 of the said rotary disk; thereby facilitating the peeling operation.

An ample supply of water should be discharged into the machine while the peeling operation is going on, or at intervals sufficient to wash away the peeling particles, as well as to keep the cutters 3 clear of peelings.

After the vegetables have been peeled and washed, as above described, they are removed from the machine by lifting the cover of the said cutting-chamber.

We do not limit ourselves to the exact form of parts herein shown and described, as it is evident that same may be changed by skilled mechanics without departing from the spirit of our invention; and that such changes will be within the scope of our claims.

For instance, suitable supporting-feet 39 having rubber tips, may be attached to the lower end of the said cutting-cylinder 2, to hold the latter elevated a slight distance above the bottom of the sink or other support, and thereby provide a free passage for the waste water and peelings, in making their exit at the lower end of said cylinder; or said feet may be omitted, and the waste discharged from time to time, by lifting the lower end of said cylinder clear of its support.

Said rotary disk 7 not only supports the vegetables when they are being peeled, but it assists in peeling them, as well as in setting them in motion, and in maintaining such motion, as long as the machine is in operation.

We claim:—

A machine for peeling vegetables; comprising a cutting-cylinder having cutters projecting from its inner surface; a vertical shaft mounted in said cylinder and extending therein axially from a point near the lower end of said cylinder to a point adjacent the upper end thereof; a rotary supporting, peeling and driving disk, carrying cutters which project from its upper surface, and said disk fixed upon said shaft near the lower end of said cylinder; the lower end of said cylinder being open, to permit the discharge thereat of the waste material; means for discharging a supply of water into the upper portion of said cylinder, to wash the peelings from said cutters, and discharge the same at the lower end of said cylinder; driving-means connected to the upper end of said vertical shaft, and located above the said cylinder, supporting-feet fixed to the lower end of said cutting-cylinder, to hold same a distance above the support for said feet, and provide a free passage for the waste water and peelings, between said support and the lower end of said cylinder, and an outer casing supported by said cylinder, and arranged to be detached from the latter, which may be lifted out of said casing, and be used independently thereof.

In testimony whereof, we have signed our names to this specification in presence of two subscribing witnesses.

HERBERT W. HODGDON.
PANSY F. GREEN.

Witnesses:
JOHN C. HIGDON,
HENRY L. HIGDON.